US011157771B2

United States Patent
Gundogdu et al.

(10) Patent No.: US 11,157,771 B2
(45) Date of Patent: Oct. 26, 2021

(54) METHOD FOR CORRELATION FILTER BASED VISUAL TRACKING

(71) Applicants: ASELSAN ELEKTRONIK SANAYI VE TICARET ANONIM SIRKETI, Ankara (TR); ORTA DOGU TEKNIK UNIVERSITESI, Ankara (TR)

(72) Inventors: Erhan Gundogdu, Ankara (TR); Abdullah Aydin Alatan, Ankara (TR)

(73) Assignees: ASELSAN ELEKTRONIK SANAYI VE TICARET ANONIM SIRKETI, Ankara (TR); ORTA DOGU TEKNIK UNIVERSITESI, Ankara (TR)

(*) Notice: Subject to any disclaimer, the term of this patent is extended or adjusted under 35 U.S.C. 154(b) by 58 days.

(21) Appl. No.: 16/612,443

(22) PCT Filed: May 12, 2017

(86) PCT No.: PCT/TR2017/050189
§ 371 (c)(1),
(2) Date: Nov. 11, 2019

(87) PCT Pub. No.: WO2018/208245
PCT Pub. Date: Nov. 15, 2018

(65) Prior Publication Data
US 2020/0202176 A1    Jun. 25, 2020

(51) Int. Cl.
*G06K 9/62*     (2006.01)
*G06K 9/20*     (2006.01)
*G06N 3/08*     (2006.01)

(52) U.S. Cl.
CPC .......... *G06K 9/6257* (2013.01); *G06K 9/2054* (2013.01); *G06K 9/6232* (2013.01); *G06K 9/6262* (2013.01); *G06N 3/08* (2013.01)

(58) Field of Classification Search
CPC .. G06K 9/6257; G06K 9/2054; G06K 9/6232; G06K 9/6262; G06N 3/08
(Continued)

(56) References Cited

U.S. PATENT DOCUMENTS

2016/0306876 A1* 10/2016 Nichols ................ G06N 7/005

OTHER PUBLICATIONS

Andrea Vedaldi, et al. Matconvnet—Convolutinoal neural networks for matlab. In Int. Conf. on Multimedia, ACM, 2015.
(Continued)

*Primary Examiner* — Michael R Neff
(74) *Attorney, Agent, or Firm* — Bayramoglu Law Offices LLC

(57) ABSTRACT

A method for learning deep convolutional features specifically designed for correlation filter based visual tracking includes the steps of, selecting a first image from a first image patch; selecting a second image from a second image patch; forward propagating selected first image by a convolutional neural network model formula, the formula has random weights with zero mean for the parameters; forward propagating selected second image by the convolutional neural network model formula; computing correlation filter using forward propagated second image and centered correlation response; circularly correlating forward propagated first image and computed correlation filter to generate predicted response map; calculating the loss by comparing the predicted response map with desired correlation corresponding selected first image and second image and updating the parameters of the convolutional neural network model formula according to calculated loss.

10 Claims, 1 Drawing Sheet

(58) Field of Classification Search
USPC .......................................................... 382/157
See application file for complete search history.

(56) References Cited

OTHER PUBLICATIONS

Erhan Gundogdu et al. Good Features to Correlate for Visual Tracking. Arxiv.Org, Apr. 20, 2017, Cornell University Library, 201 Olin Library Cornell University Ithaca, NY 14853.
Danelljan Martin et al. Convolutional Features for Correlation Filter Based Visual Tracking, 2015 IEEE International Conference on Computer Vision Workshop(ICCVW), IEEE, Dec. 7, 2015, pp. 621-629.

* cited by examiner

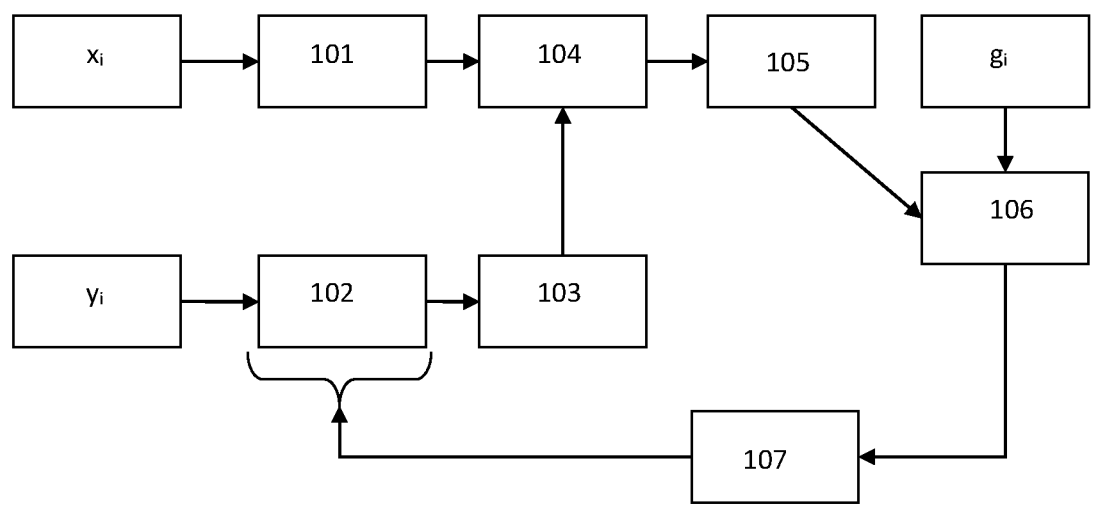

METHOD FOR CORRELATION FILTER BASED VISUAL TRACKING

CROSS REFERENCE TO THE RELATED APPLICATIONS

This application is the national phase entry of International Application No. PCT/TR2017/050189, filed on May 12, 2017, the entire contents of which are incorporated herein by reference.

TECHNICAL FIELD

This invention is related to a method for learning deep convolutional features specifically designed for correlation filter based visual tracking.

BACKGROUND

In order to analyse images for targets, one of the used methods is using deep learning applications. Deep learning is a class of machine learning algorithms based on learning representations. Deep learning is not only used for analysing images, but also used for different machine learning applications. In deep learning, different neural networks may be created according to the needs of the system.

Said neural networks are trained by applying backpropagation of its parameters on a pre-defined loss function. Different neural networks require different loss functions therefore their training methods may vary. For example, in order to classify objects in an image, different features of the objects are learned during the training.

Although pre-trained networks which are trained for visual object classification purposes give reliable results for identifying objects, said neural networks may be insufficient for extraction of features specialized in correlation filter based visual tracking operation.

SUMMARY

With the present application, a method for learning deep convolutional features specifically designed for correlation filter based visual tracking is provided. Said method comprises the steps of, selecting a first image ($x_i$) from a first image patch; selecting a second image ($y_i$) from a second image patch; forward propagating selected first image ($x_i$) by a convolutional neural network model formula ($f_\theta(.)$), wherein said formula has random weights with zero mean for the parameters ($\theta$); forward propagating selected second image ($y_i$) by said convolutional neural network model formula ($f_\theta(.)$); computing correlation filter using forward propagated second image ($y_i$) and centered correlation response ($c_i$); circularly correlating forward propagated first image ($x_i$) and computed correlation filter to generate predicted response map; calculating the loss by comparing the predicted response map with desired correlation ($g_i$) corresponding selected first image ($x_i$) and second image ($y_i$) and updating the parameters ($\theta$) of said convolutional neural network model formula ($f_\theta(.)$) according to calculated loss.

The main object of the invention is to provide a method for learning deep convolutional features specifically designed for correlation filter based visual tracking.

Another object of the invention is to provide a reliable method.

BRIEF DESCRIPTION OF THE DRAWINGS

FIGURE shows a flowchart of the method of the present invention.

| | |
|---|---|
| First image | ($x_i$) |
| Second image | ($y_i$) |
| Desired correlation | ($g_i$) |
| Centered correlation | ($c_i$) |
| Forward propagating first image | (101) |
| Forward propagating second image | (102) |
| Computing correlation filters | (103) |
| Circular correlation | (104) |
| Generating predicted response map | (105) |
| Calculating loss | (106) |
| Updating model parameters | (107) |

DETAILED DESCRIPTION OF THE EMBODIMENTS

Nowadays, deep learning applications are used in number of areas. One of the uses of deep learning applications is analyzing images for tracking purposes. In the correlation filter based tracking methods, feature maps which are generated by pre-training methods or which are hand-crafted are used. However, since known methods that utilize pre-trained networks are not designed for correlation task and reliability of the hand-crafted feature maps are low, said feature maps are not suitable to be used for correlation filter based tracking operations. Therefore, according to the present invention, a method for learning deep convolutional features specifically designed for correlation filter based visual tracking is provided.

A flow diagram of the method of the present invention is given in the FIGURE. In this method, a first image patch comprising plurality of first images ($x_i$) containing an object; a second image patch comprising plurality of second images ($y_i$) containing same object, wherein in said second images ($y_i$), said object is located at the center; centered correlation response ($c_i$), which is used for determining correlation response according to second images ($y_i$) and a third image patch containing desired correlation ($g_i$) for each first image ($x_i$) and second image ($y_i$), wherein desired response is generated such that it has a peak at the relative location of the first image ($x_i$) with respect to second image ($y_i$), are used. Said method comprises the steps of, selecting a first image ($x_i$) from first image patch; selecting a second image ($y_i$) from second image patch; forward propagating selected first image ($x_i$) (101) by a convolutional neural network model formula ($f_\theta(.)$), wherein said formula has random weights with zero mean for the parameters ($\theta$); forward propagating selected second image ($y_i$) (102) by said convolutional neural network model formula ($f_\theta(.)$); computing correlation filter using forward propagated second image ($y_i$) and centered correlation response ($c_i$) (103); circularly correlating forward propagated first image ($x_i$) and computed correlation filter (104) to generate predicted response map (105); calculating the loss (106) by comparing the predicted response map (105) with desired correlation ($g_i$) corresponding selected first image ($x_i$) and second image ($y_i$) and updating the parameters ($\theta$) of said convolutional neural network model formula ($f_\theta(.)$) according to calculated loss (107).

In a preferred embodiment of the present application, after updating the parameters ($\theta$) of formula ($f_\theta(.)$), method is iterated with updated parameters ($\theta$) at least once. At each iteration, calculated loss reduces. That means, at each iteration, predicted response map becomes closer to desired correlation. In a preferred embodiment, number of the iterations are limited by a predefined number (MaxIter). In an alternative embodiment, iterations are performed until calculated loss is less than a predefined value.

In another preferred embodiment of the present application, said convolutional neural network model formula ($f_\theta(.)$) is preferably a deep fully convolutional network (in other words comprising plurality of layers). In other words, said convolutional neural network model formula ($f_\theta(.)$) satisfies the following requirements;

If $I_\theta[u][v]=f_\theta(I[u][v])$, and If $Y_\theta[u][v]=f_\theta(I[u-k\delta_u][v-k\delta_v])$, then $Y_\theta[u][v]\approx I_\theta[u-\delta_u][v-\delta_v]$ where k is the scale factor. In other words, these types of functions are shift invariant by a scale factor k.

Convolutional neural network model formula ($f_\theta(.)$) preferably uses and RGB image P ($P \in R^{N \times N \times 3}$) and generates another image with different dimensions ($f_\theta(P) \in R^{T \times T \times d}$). Since said formula ($f_\theta(.)$) is preferably a deep fully convolutional network, each different layer of the formula ($f_\theta(.)$) may generate different images with different dimensions ($f1_\theta(P) \in R^{S \times S \times r}$).

In another preferred embodiment of the present application, convolutional neural network model formula ($f_\theta(.)$) with updated parameters ($\theta$) is used for generating a predicted response map. In this embodiment, generation of a predicted response map comprises the steps of, selecting a first image ($x_i$) from first image patch; selecting a second image ($y_i$) from second image patch; forward propagating selected first image ($x_i$) (101) by convolutional neural network model formula ($f_\theta(.)$), with updated parameters ($\theta$); forward propagating selected second image ($y_i$) (102) by said convolutional neural network model formula ($f_\theta(.)$) with updated parameters ($\theta$); computing correlation filter using forward propagated second image ($y_i$) and centered correlation response ($c_i$) (103); circularly correlating forward propagated first image ($x_i$) and computed correlation filter (104) to generate predicted response map (105).

Since convolutional neural network model formula ($f_\theta(.)$) is preferably a deep fully convolutional network, any layer of the convolutional neural network model formula ($f_\theta(.)$) with updated parameters ($\theta$) is used in the steps of forward propagating first image (101) and forward propagating second image (102). In this embodiment, if different layers of the convolutional neural network model formula ($f_\theta(.)$) with updated parameters ($\theta$) generate images with different sizes, all generated images are brought to same size (for example to a size that generated by the last layer of the convolutional neural network model formula ($f_\theta(.)$) with updated parameters ($\theta$)) by a resizing (rescaling) operation.

In another preferred embodiment of the present application, step of computing correlation filter using forward propagated second image ($y_i$) (103) is performed by the following formula;

$$h_i^l = F^{-1}\left\{\frac{Y_i^{l*} \odot C_i^l}{\sum_{m=1}^d Y_i^m \odot Y_i^{m*} + \lambda}\right\} \qquad (1)$$

wherein, $h_i^l$ represents correlation filter for the $l^{th}$ feature channel of the computed correlation filter $h_i$, $F^{-1}$ represents inverse discrete Fourier transform (DFT) operation, $C_i$ represents signal of centered correlation ($c_i$) in DFT domain, $Y_i^l$ represents $l^{th}$ feature channel of second image ($y_i$) in DFT domain and $\lambda$ represents regularization parameter.

In another preferred embodiment of the present application, step of circularly correlating forward propagated first image ($x_i$) and computed correlation filter (104) is performed by the following formula;

$$c[n]=\Sigma_i a[i]b[n+i]=F^{-1}\{A^* \odot B\} \qquad (2)$$

wherein $F^{-1}\{.\}$ represents the inverse DFT operation, $b[n+i]$ represents circularly shifted version of the signal $b[n]$ by $i$ amount to the left, and $\odot$ is the element wise multiplication operation.

In another preferred embodiment of the present application, step of calculating the loss (106) is performed by the following formula;

$$L_i(\theta) = \|\Sigma_{l=1}^d h_i^l(\theta) \circledast x_i^l(\theta) - g_i\|^2 \qquad (3)$$

wherein $L_i(\theta)$ represents loss value for the training samples $x_i$, $y_i$ and $g_i$, $h_i^l(\theta)$ represents computed correlation filter for $l^{th}$ feature map $\forall l \in \{1, \ldots, d\}$, $x_i^l(\theta)$ represents the output of the forward propagated first image ($x_i$) $\forall l \in \{1, \ldots, d\}$, $\circledast$ represents circularly correlation operation (as defined in formula (2)) and $g_i$ represents desired correlation ($g_i$).

In another preferred embodiment of the present application, step of updating the parameters ($\theta$) of said convolutional neural network model formula ($f_\theta(.)$) according to calculated loss (107) comprises calculating a loss gradient. Said gradient is preferably calculated with the following formula by the help of chain rule;

$$\nabla_\theta L_i = \sum_l \frac{dL}{dx_i^l}\frac{dx_i^l}{d\theta} + \sum_l \frac{dL}{dy_i^l}\frac{dy_i^l}{d\theta} \qquad (4)$$

wherein $\nabla_\theta L_i$ is the gradient of the loss $L_i$.

$$\frac{dy_i^l}{d\theta} \text{ and } \frac{dy_i^l}{d\theta}$$

are Jacobians, calculated using the standard backpropagation rules which are frequently utilized by the deep learning libraries (for example as disclosed in the paper "A. Vedaldi and K. Lenc. Matconvnet—convolutinoal neural networks for matlab. In Int. Conf. on Multimedia, A C M, 2015"). In order to calculate remaining terms of the formula (4), chain rule is applied by following formulas;

$$\frac{dL}{dy_i^k} = \sum_l \frac{dL}{dh_i^l}\frac{dh_i^l}{dy_i^k} \qquad (5)$$

$$\frac{dL}{dh_i^l} = F^{-1}\{E^* \odot X_i^l\} \qquad (6)$$

$$\frac{dL}{dx_i^l} = F^{-1}\{E \odot H_i^l\} \qquad (7)$$

$$E = F\left\{\sum_{l=1}^d h_i^l \odot x_i^l - g_i\right\} \qquad (8)$$

$$\frac{dH_i^l}{dY_i^k} = I(l==k)\text{diag}\left(\frac{C_i^*}{\sum_{m=1}^d Y_i^{m*} \odot Y_i^m + \lambda}\right) - \\ \text{diag}\left(\frac{C_i^* \odot Y_i^l \odot Y_i^{k*}}{(\sum_{m=1}^d Y_i^{m*} \odot Y_i^m + \lambda)^2}\right) - \text{diag}\left(\frac{C_i^* \odot Y_i^l \odot Y_i^k}{(\sum_{m=1}^d Y_i^{m*} \odot Y_i^m + \lambda)^2}\right)M \qquad (9)$$

where $I(.)$ is the indicator function outputting 1 for a correct argument and 0 otherwise. M is the matrix for the circular time reversal operation.

If the following auxiliary signals are defined as:

$$K_1 = I(l == k)\text{diag}\left(\frac{C_i^*}{\sum_{m=1}^{d} Y_i^{m*} \odot Y_i^m + \lambda}\right) \quad (10)$$

$$K_2^{lk} = \text{diag}\left(\frac{C_i^* \odot Y_i^l \odot Y_i^{k*}}{(\sum_{m=1}^{d} Y_i^{m*} \odot Y_i^m + \lambda)^2}\right) \quad (11)$$

$$K_3^{lk} = \text{diag}\left(\frac{C_i^* \odot Y_i^l \odot Y_i^{k*}}{(\sum_{m=1}^{d} Y_i^{m*} \odot Y_i^m + \lambda)^2}\right) \quad (12)$$

$$\frac{dH_i^l}{dY_i^k} = F^H \frac{dh_i^l}{dy_i^k} F = F^H(K_1 - K_2^{lk} - K_3^{lk} M)F \quad (13)$$

where F and $F^H$ are DFT and inverse DFT matrices, formula (5) can be represented as following formula;

$$\frac{dL}{dy_i^k} = \sum_{l=1}^{d} F^{-1}\{(K_1 - K_2^{lk})^* \odot A_i^l - K_3^{lk} \odot A_i^{l*}\} \quad (14)$$

Where $a_i^l = dL_i/dh_i^l$ and $A_i^l$ is the DFT of $a_i^l$. During the gradient calculations, gradient terms for backpropagating the activations from the loss to the inputs of the network are derived. According to formula (14), the calculation of the backpropagation has the complexity of the computation of the DFT, which is performed by a Fast Fourier Transform algorithm with complexity $O(N \log(N))$ where N is the length of the signal.

It should also be noted that all of the above derivations are performed for one-dimensional case. These derivations are also valid for two-dimensional case as well, since the Discrete Fourier Domain operations are separable in two different dimensions.

Step of updating the parameters (θ) of said convolutional neural network model formula ($f_\theta(.)$) according to calculated loss (107) further comprises following formula;

$$\theta \leftarrow \theta - \mu \frac{dL_i}{d\theta} \quad (15)$$

wherein μ is the learning rate and $$\frac{dL_i}{d\theta}$$

is the mean gradient for the model ($f_\theta(.)$), wherein said mean gradient is average of the loss gradients calculated by formula (4) for different selected first image ($x_i$), second image ($y_i$) and corresponding desired correlation ($g_i$) triplets.

What is claimed is:

1. A method for learning deep convolutional features specifically designed for correlation filter based visual tracking, the method comprising steps of:
   selecting a first image from a first image patch;
   selecting a second image from a second image patch;
   forward propagating the selected first image by a convolutional neural network model formula, wherein the convolutional neural network model formula has random weights with a zero mean for a plurality of parameters;
   forward propagating the selected second image by the convolutional neural network model formula;
   computing a correlation filter using the forward propagated second image and a centered correlation response;
   circularly correlating the forward propagated first image and a computed correlation filter to generate a predicted response map;
   calculating a loss by comparing the predicted response map with a desired correlation corresponding the selected first image and the second image and updating the plurality of parameters of the convolutional neural network model formula according to the calculated loss, wherein, the step of calculating the loss is performed by the following formula;

$$L_i(\theta) = \left\|\sum_{l=1}^{d} h_i^l(\theta) \circledast x_i^l(\theta) - g_i\right\|^2$$

wherein $L_i(\theta)$ represents the loss value for the training samples $x_i$, $y_i$ and $g_i$, $h_i^l(\theta)$ represents computed correlation filter for an $l^{th}$ feature map $\forall l \in \{1, \ldots, d\}$, $x_i^l(\theta)$ represents an output of the forward propagated first image $(x_i) \forall l \in \{1, \ldots, d\}$, $\circledast$ represents a circularly correlation operation and $g_i$ represents the desired correlation.

2. The method according to claim 1, wherein, the gradient is calculated with the following formula using a chain rule;

$$\nabla_\theta L_i = \sum_l \frac{dL}{dx_i^l} \frac{dx_i^l}{d\theta} + \sum_l \frac{dL}{dy_i^l} \frac{dy_i^l}{d\theta}.$$

3. The method according to claim 1, wherein, the step of updating the parameters of the convolutional neural network model formula according to the calculated loss further comprises following formula;

$$\theta \leftarrow \theta - \mu \frac{dL_i}{d\theta}$$

wherein μ is a learning rate and $$\frac{dL_i}{d\theta}$$

is a mean gradient for the model.

4. A method for generating the predicted response map using the convolutional neural network model formula, with the plurality of parameters updated according to the method for learning deep convolutional features specifically designed for correlation filter based visual tracking according to claim 1, comprising steps of:
   selecting the first image from the first image patch;
   selecting the second image from the second image patch;
   forward propagating the selected first image by the convolutional neural network model formula, with the plurality of updated parameters;
   forward propagating the selected second image by the convolutional neural network model formula with the plurality of updated parameters;

computing the correlation filter using the forward propagated second image and the centered correlation response;

circularly correlating the forward propagated first image and the computed correlation filter to generate the predicted response map wherein any layer of the convolutional neural network model formula with the plurality of updated parameters is used in the steps of the forward propagating first image and the forward propagating second image.

5. The method according to claim 4, wherein, when different layers of the convolutional neural network model formula with the plurality of updated parameters (θ) generate a plurality of images with different sizes, resizing all the plurality of generated images are to a same size by a resizing operation.

6. A method for learning deep convolutional features specifically designed for correlation filter based visual tracking, the method comprising steps of:

selecting a first image from a first image patch;

selecting a second image from a second image patch;

forward propagating the selected first image by a convolutional neural network model formula, wherein the convolutional neural network model formula has random weights with a zero mean for a plurality of parameters;

forward propagating the selected second image by the convolutional neural network model formula;

computing a correlation filter using the forward propagated second image and a centered correlation response, wherein the computing correlation filter using the forward propagated second image is performed by the following formula $$h_i^l = F^{-1}\left\{\frac{Y_i^{l*} \odot C_i^l}{\sum_{m=1}^{d} Y_i^m \odot Y_i^{m*} + \lambda}\right\}$$

wherein, $h_i^l$ represents correlation filter for an $l^{th}$ feature channel of the computed correlation filter $h_i$, $F^{-1}$ represents an inverse discrete fourier transform (DFT) operation, $C_i$ represents a signal of the centered correlation response in DFT domain, $Y_i^l$ represents an $l^{th}$ feature channel of the second image in DFT domain and λ represents a regularization parameter;

circularly correlating the forward propagated first image and a computed correlation filter to generate a predicted response map;

calculating a loss by comparing the predicted response map with a desired correlation corresponding the selected first image and the second image and updating the plurality of parameters of the convolutional neural network model formula according to the calculated loss.

7. The method according to claim 6, wherein, after updating the parameters of convolutional neural network model formula, repeating the steps of forward propagating the first image, forward propagating the second image, computing the plurality of correlation filters, the circular convolution in frequency domain using DFT, generating the predicted response map, calculating the loss and updating the plurality of model parameters using iterated with a plurality of updated parameters at least once.

8. The method according to claim 6, wherein, the convolutional neural network model formula is a deep fully convolutional network.

9. The method according to claim 6, wherein, the step of circularly correlating the forward propagated first image and the computed correlation filter is performed by the following formula;

$$c[n] = \sum_i a[i]b[n+i] = F^{-1}\{A^* \odot B\}$$

wherein $F^{-1}\{.\}$ represents an inverse DFT operation, b[n+i] represents a circularly shifted version of the signal b[n] by i amount to the left, and ⊙ is an element wise multiplication operation.

10. The method according to claim 6, wherein, the step of updating the parameters of the convolutional neural network model formula according to the calculated loss comprises calculating a loss gradient.

* * * * *